US005802383A

United States Patent [19]

Li et al.

[11] Patent Number: 5,802,383
[45] Date of Patent: Sep. 1, 1998

[54] METHOD AND APPARATUS FOR DISPLAYING CLUSTERS ON A COMPUTER NETWORK

[75] Inventors: Shih-Gong Li; David Yu Chang, both of Austin, Tex.

[73] Assignee: International Business Machines Corporation, Armonk, N.Y.

[21] Appl. No.: 666,721

[22] Filed: Jun. 18, 1996

Related U.S. Application Data

[63] Continuation of Ser. No. 46,608, Apr. 12, 1993, Pat. No. 5,535,403.
[51] Int. Cl.$^6$ .................................................. G06F 3/14
[52] U.S. Cl. .................... 395/800; 395/141; 395/200.11; 395/348
[58] Field of Search ................. 395/800, 200.01, 395/141, 339, 348, 200.11, 356, 329

[56] References Cited

U.S. PATENT DOCUMENTS

| | | |
|---|---|---|
| 5,025,395 | 6/1991 | Nose et al. ............................ 395/335 |
| 5,136,690 | 8/1992 | Becker et al. ........................ 395/349 |
| 5,233,688 | 8/1993 | Too ....................................... 395/140 |
| 5,261,044 | 11/1993 | Dev et al. ........................... 395/357 |
| 5,270,919 | 12/1993 | Blake et al. ........................ 340/827 |
| 5,276,789 | 1/1994 | Besaw et al. ....................... 395/140 |
| 5,295,243 | 3/1994 | Robertson et al. ................ 395/348 |
| 5,295,244 | 3/1994 | Dev et al. ........................... 395/357 |
| 5,394,522 | 2/1995 | Sanchez-Frank et al. ......... 395/349 |
| 5,452,415 | 9/1995 | Hotka ................................. 395/329 |
| 5,485,567 | 1/1996 | Banning et al. ................... 395/604 |

*Primary Examiner*—Alyssa H. Bowler
*Assistant Examiner*—Walter D. Davis
*Attorney, Agent, or Firm*—Jeffrey S. LaBaw

[57] ABSTRACT

A method and apparatus for monitoring the status of a computer network by displaying polygon-shaped objects (or "icons") to represent groups of devices connected to the network. In a preferred embodiment each device (or "node") on the network is assigned to one of a number of groups (or "clusters"), each cluster is represented as a polygon-shaped object on a computer system display, and the number of sides for each polygon is displayed according to the size of the group represented. The appearance of the sides of each polygon may also help indicate the size of the group. A base value may be varied to partly govern the shape and appearance of the polygon.

21 Claims, 4 Drawing Sheets

METHOD AND APPARATUS FOR DISPLAYING CLUSTERS ON A COMPUTER NETWORK

This application is a continuation of application Ser. No. 08/046,608 filed Apr. 12, 1993, now U.S. Pat. No. 5,535,403.

BACKGROUND OF THE INVENTION

This invention relates generally to monitoring the status of a computer network. More particularly, the invention concerns a method and apparatus for displaying an object representing the number of nodes in a group of computer network nodes.

It is well known in the design and operation of computer networks to segment networks for various reasons. For example, devices, referred to as "nodes", on a network may be assigned to groups, also referred to as "clusters", according to traffic patterns so that the nodes within a cluster communicate more directly with each other than with other nodes. Grouping usually enhances the efficiency of transactions for the entire network as well as for the nodes within each group. Nodes may also be assigned to groups according to differences in the transmission media between nodes, the location of the nodes or for security purposes.

It is also well known to announce conditions in a system by changing the appearance of a symbol on a computer display in order to attract attention to the status of the system when a certain circumstance occurs. For example, the volume or rate of network transactions among a group of nodes may be monitored in this manner. Then, when the volume or rate of transactions within a cluster exceeds a preset limit a symbol representing that group will alert the user to investigate the condition.

One drawback to the traditional monitoring approach concerns the limited information conveyed to the user to help in an investigation of the system. For example, with the usual system when a symbol announces that the volume of transactions has exceeded a limit within a cluster, the user must take steps to get more data about that cluster. Usually, this involves selecting the symbol that represents the cluster demanding attention and changing the computer display to show details. For this and other applications, it would be useful to provide the user with more immediate information about the size of each cluster on the network, since the volume or rate of transactions in a group may be affected by the group's size. This is particularly true where the network has clusters of diverse sizes and where the network has many clusters which simultaneously demand attention.

This need to provide concise status information is increasing. There is a trend toward larger, more complex networks because of distributed processing and parallel processing. Also, since individual network devices are becoming more powerful and less expensive users tend to add to and reconfigure networks more frequently. Under these circumstances, it is more important but harder to monitor the status of computer networks.

SUMMARY OF THE INVENTION

An object of the invention is to monitor the status of nodes connected to a computer network.

Another object is to display the number of network nodes assigned to a group.

A still further object is to visually indicate network nodes in groups of various sizes in which the size of each group is easily recognizable.

According to the present invention the foregoing and other objects are attained by a method which includes selecting a polygon to represent the number of nodes in the group and presenting the polygon on a computer system display coupled to the computer network.

In accordance with one aspect of the invention, the polygon has a number of sides. The method includes selecting a certain number of sides for the polygon, the number of sides signifying the size of the group represented by that polygon. In the terminology of the invention, the "size" of a group is defined as the number of nodes in that group. The sides of the polygon may also be selected to have a certain appearance further indicating the size of the group represented.

The shape and appearance of the polygon may also be governed by a base value. The base value may be varied or else the base value may be constant for all icons according to the user's preference, which may be influenced by the topology of the network. In a preferred embodiment, the method also includes selecting a base value which further governs the selection of the number of sides for the polygon. The appearance of the sides may also be governed in part by the base value.

In accordance with another aspect of the invention, the nodes are each assigned to one of a plurality of groups. An icon is displayed for each of the groups and the shape and appearance of each icon indicates the size of the corresponding group. The base value may be selected by the preference of the user or according to predetermined criteria such as the size of the largest group of nodes, the size of the smallest group of nodes or the distribution of the sizes of the groups.

Also according to the present invention, an apparatus is provided which includes a computer system display coupled to the network, a means for selecting a polygon to represent the number of nodes in the group and a means for presenting the previously described polygon on the computer system display. In one aspect of the apparatus, the selecting means describes the number of sides and appearance of sides which may be selected for the polygon. The selecting means further picks from a table certain data corresponding to a description selected for the polygon and constructs a data structure for the polygon. The presenting means uses the data structure to build an icon for presentation on the computer system display. The selection and presentation means reside in a computer memory and are acted upon by a computer processor according to programmed instructions.

Also according to the present invention, a computer program product is provided which includes a means for instructing a computer to show the polygon on a computer system display. In one aspect of the invention, the computer program product includes instructions on a computer disk for transferring into a computer memory and directing actions of a computer processor.

The means of the invention for displaying the number of network nodes assigned to a group is advantageous in providing easily recognizable information to help a user find groups of a chosen size. This means is further advantageous in helping a user identify the relative sizes of groups, which may enable quickly identifying groups that require attention.

BRIEF DESCRIPTION OF THE DRAWINGS

This invention will become more easily understood by the following detailed description of a preferred embodiment of the invention with reference to the attached drawings, in which.

DETAILED DESCRIPTION OF THE DRAWINGS

Figure 1:
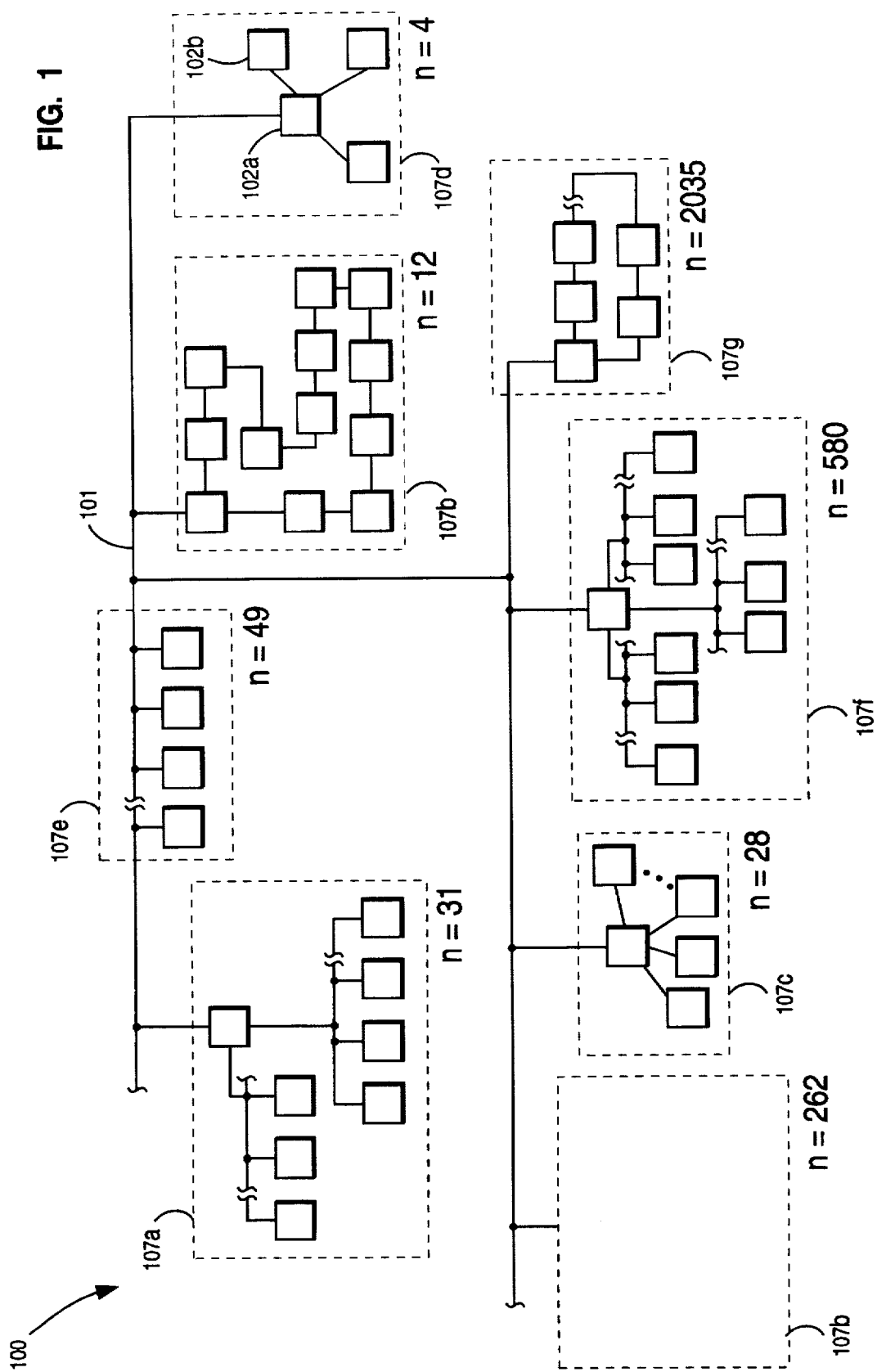
FIG. 1 illustrates a computer network having nodes in groups of various sizes.

In FIG. 1, a computer network is shown with a variety of nodes. The network 100 has a transmission medium 101 over which a variety of devices may communicate. Nodes 102a, 102b, etc. may include devices such as work stations 103, file servers 104, cell controllers 105, bridges 106, etc., all of which may be connected to the network 100 in groups of various sizes.

In the network depicted here the nodes have been assigned to eight groups 107a through 107h. According to the terminology of the present invention, the size of a group is defined as the number of nodes, n, in the group. In this example, the groups are of widely varying sizes as may be seen in the illustration.

Figure 2:
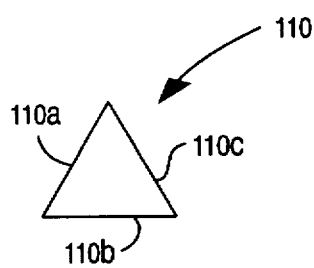
FIG. 2 illustrates an icon for a group having 31 nodes.

FIG. 2 illustrates a triangular shaped object 110 for representing a group such as 107a in FIG. 1 having 31 nodes. No base value was selected in this example. The base value was assumed to be a constant equal to 10, however other conventions could be adopted. Thus, in the present example, each side of the icon is assigned to represent 10 nodes. Since the number of nodes is at least 30, a polygon having at least three sides is required. Since the number of nodes is less than 40, a polygon shape was selected to have 3 sides 110a, 110b, and 110c and all the sides are displayed as solid lines, also referred to as "bars", indicating that each side counts in representing the number of nodes.

Figure 3:
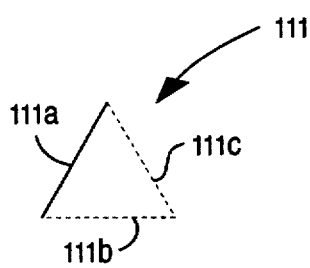
FIG. 3 illustrates an icon for a group having 12 nodes.

FIG. 3 illustrates an icon 111 for a group such as 107b in FIG. 1 having 12 nodes. In this case, since the number of nodes to be represented is less than the minimum number of sides of a triangle, which is a minimum-sided polygon, a triangle shape has been selected having a certain feature in the appearance of the sides that indicates which sides apply toward representing nodes. In this case, that certain feature concerns showing the sides which represent nodes as a solid bar and showing as a bar having dashed lines those sides which do not count. Therefore, for this group of 12 nodes, only one side 111a of icon 111 is shown as a solid bar to represent that there are somewhere between 10 and 19 nodes in group 107b. The other sides 111b and 111c are displayed in dashed lines to indicate that they do not represent any nodes.

Figure 4:
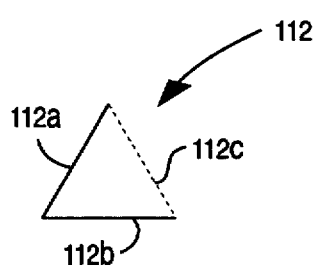
FIG. 4 illustrates an icon for a group having 28 nodes.

FIG. 4 illustrates an icon 112 for a group such as 107c in FIG. 1 having 28 nodes. Two sides 112a and 112b are shown as a solid single bar and the other side 112c is a dashed single bar, thereby representing that there are 20 to 29 nodes in the group.

Figure 5:
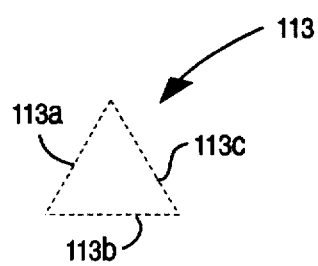
FIG. 5 illustrates an icon for a group having four nodes.

FIG. 5 illustrates an icon 113 for a group such as 107d in FIG. 1 having four nodes. All three sides 113a, 113b, and 113c are dashed to indicate that there are less than 10 nodes in the group.

Figure 6:
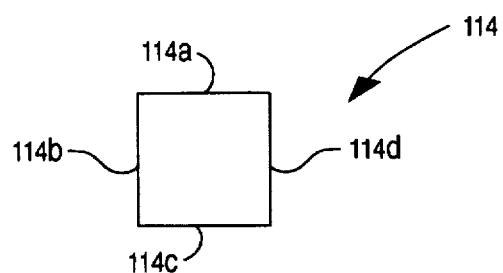
FIG. 6 illustrates an icon for a group having 49 nodes.

FIG. 6 illustrates an icon 114 for a group such as 107e in FIG. 1 having 49 nodes. According to the convention discussed previously, each side of the polygon represents 10 nodes. Since the number of nodes in the group represented is less than 50 but greater than 40 a polygon 114 having four sides 114a, 114b, 114c, and 114d has been selected and all the sides are shown as solid bars.

Figure 7:
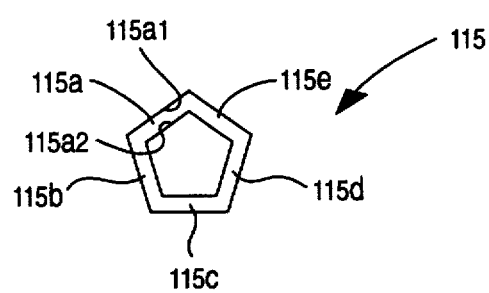
FIG. 7 illustrates an icon for a group having 580 nodes.

FIG. 7 illustrates an icon 115 for a group such as 107f in FIG. 1 having 580 nodes. In the examples above, each single bar polygon side represents only 10 nodes. Since the number of nodes in group 107f is large, it is desirable to vary the appearance of the sides rather than to have a polygon with a large number of sides. In this case, each side of the polygon is displayed as two bars to indicate that each side represents the constant value 10 raised to the power of two (i.e., $10^2$). That is, the number of bars indicates an exponent, or power, for the constant base value 10. Thus, two bars signifies 10 raised to the second power (i.e., $10^2$, or 100).

Therefore, since the number of nodes in the group is less than 600 and greater than 500, a polygon 115 having five solid sides 115a through 115e has been selected where each side appears as two solid bars, such as side 115a having bars 115a1 and 115a2.

Figure 8:
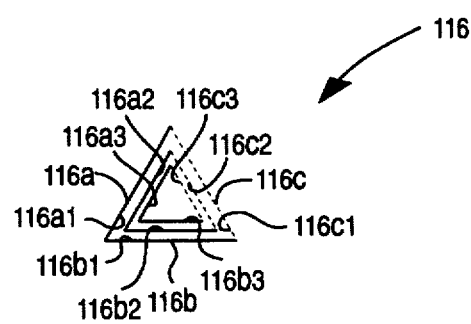
FIG. 8 illustrates an icon for a group having 3035 nodes.

FIG. 8 illustrates an icon 116 for a group such as 107g in FIG. 1 having 2035 nodes. The appearance of the polygon sides for this group 107g has been selected to appear as triple bars, thereby indicating that each side represents 1000 nodes. To represent 2035 nodes, a polygon with three sides 116a, 116b and 116c has been selected; where side 116a appears as three solid bars 116a1, 116a2 and 116a3; side 116b appears as three solid bars 116b1, 116b2 and 116b3; and side 116c appears as three dashed bars 116c1, 116c2 and 116c3. Since the appearance of the polygon sides indicates that only two of the sides count in representing nodes, and since each of the sides represents 1000 nodes, the polygon represents a group of at least 2000 nodes (i.e., at least 2 sides×1000 nodes/side=2000 nodes), but less than 3000 nodes (i.e., less than 3 sides×1000 nodes/side 3000 nodes ). This minimum and maximum number of nodes which the polygon represents may be referred to as the "range" of nodes represented by the polygon.

Figure 9:
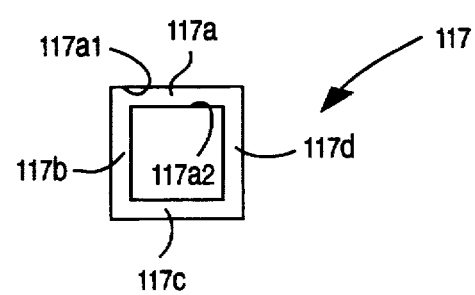
FIG. 9 illustrates a base 8 icon for a group having 262 nodes.

FIG. 9 illustrates a base eight icon 117 for a group such as 107h in FIG. 1 having 262 nodes. This example illustrates the use of a variable base value. Rather than having a constant value of 10, a variable base value has been used and the value of eight was selected. The appearance of the polygon sides was selected as double bars so that each side represents $8^2$ (i.e. 64) nodes. Thus, a polygon with four sides 117a through 177d is displayed, where each side appears as double solid bars, such as side 117a having bars 117a1 and 117a2, thereby representing a group of nodes on the order of 256 in number.

Certain aspects depicted in the embodiments of the present invention described above may be further expressed mathematically. According to this expression:

$$K^{S*} \le N < K^{S*}(S+1);$$

where
S=the number of sides for a given polygon shaped object;
K=a constant for some or all of the polygons, or a base value which may vary with each polygon;

B=the number of bars displayed for the sides of the given polygon; and

N=the number of nodes in the group represented by the given polygon.

It may be understood from the foregoing examples that there is room for flexibility in choosing an object to be displayed. For example, there is flexibility in selecting the number of sides and the appearance of the sides of a selected polygon shape. Polygons with more sides and less bars may be substituted for those with fewer sides and more bars per side. Further, alternative means such as bar color or intensity may be used to indicate the power to which the single bar value is raised, rather than using multiple bars. Also, variable base values may be used in order to alter the number of sides and bars required to represent a certain number of nodes.

Icon selection may vary according to numerous objectives and criteria. The shape and appearance of icons may be varied according to particular criteria preferred by the user, or a variety of useful selections could be suggested to the user by an automatic evaluation using fixed criteria. It may be most useful in many applications to provide objects for display which have an easily recognized number of sides and bars even if this means sacrificing the precision of information represented by each object. In some other applications, it may more desirable to provide objects less easily recognizable but which convey more precise information. Choices also may depend somewhat on the diversity of cluster sizes, that is, the size of the smallest and largest clusters in the network. The choices may also depend on the distribution of sizes, that is, the relative numbers of clusters of various sizes. For example, suppose the smallest cluster in the network has 10 nodes and the largest has 1000. In this case sufficient information may be provided to the user by selecting a constant base value 10 for all the icons. However, where the smallest cluster has 10 nodes and the largest has 10,000 it may be preferred to vary the base values among the icons according to the size of the cluster each icon represents. On the other hand, in this same case, where the smallest cluster has 10 nodes and the largest has 10,000, if the distribution is such that most clusters have more than 100 nodes, then it may be preferable to use a constant base value of 100.

Figure 10:
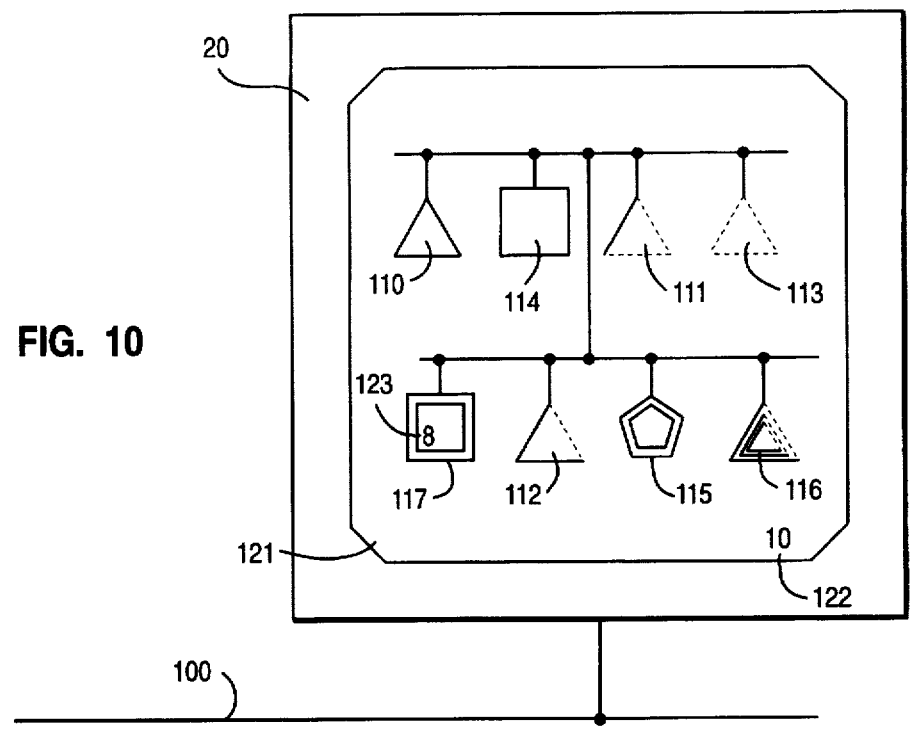
FIG. 10 illustrates a display apparatus as it might appear in monitoring the network of FIG. 1.

FIG. 10 illustrates a computer system display 120 showing an image 121 for the network 100 depicted in FIG. 1. Image 121 includes polygon shaped icons 110 through 117. These polygons were described in FIGS. 2 through 9 as representing node groups 107a through 107h of FIG. 1.

In FIG. 10, the number "10" is shown at location 122 on the image 121 indicating that each single bar polygon side represents 10 nodes. The number displayed at location 122 could be omitted where a constant is assumed for the value of the polygon sides as it was here in FIGS. 2 through 8. Where a variable base value is selected for a particular object, it may be displayed nearby or in the object. In FIG. 10 the number "8", which is the particular base value selected for object 117, is shown at location 123 on image 121.

Figure 11:
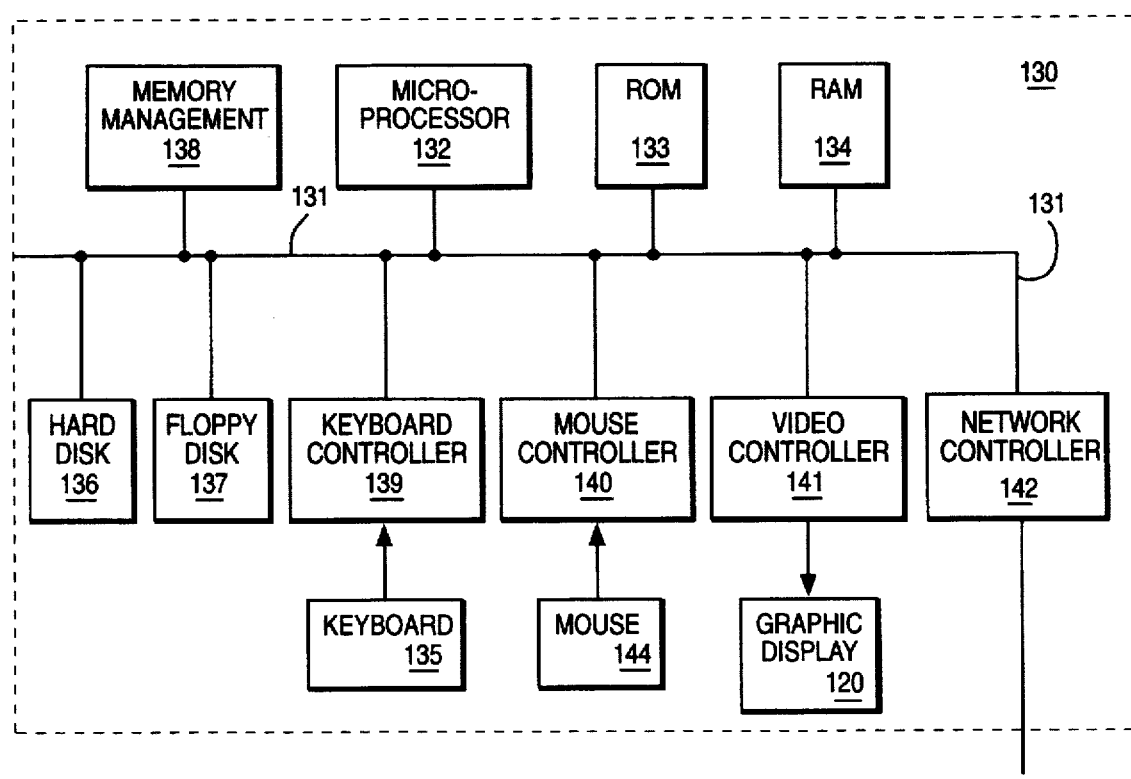
FIG. 11 is a block diagram of the components of the computer network monitoring apparatus.

FIG. 11 shows a block diagram of the components of the computer network monitoring apparatus. The apparatus includes a computer 130 with a system bus 131 to which various components are coupled and by which communication between the various components is accomplished. A microprocessor 132 is connected to the system bus 131 and is supported by read only memory (ROM) 133 and random access memory (RAM) 134 also connected to system bus 131. The microprocessor 132 is one of the Intel family of microprocessors including the 8088, 286, 388 or 486 microprocessors. However, other microprocessors, including but not limited to Motorola's family of microprocessors such as 68000, 68020, or the 68030 microprocessors and various Reduced Instruction Set Computer (RISC) microprocessors manufactured by IBM, Hewlett Packard, Sun, Motorola and others may be used.

The ROM 133 contains code including the Basic Input/ Output System (BIOS) which controls basic hardware operations such as the interactions of the keyboard 135 and disk drives 136 and 137. The RAM 134 is the main memory into which the operating system and the image application programs are loaded, including the user interface of the present invention. The memory management chip 138 is connected to the system bus 131 and controls direct memory access operations including passing data between the RAM 134 and a hard disk drive 136 and floppy disk drive 137.

Also connected to the system bus 131 are four controllers: the keyboard controller 139, the mouse controller 140, the video controller 141, and the network controller 142. As might be expected, the keyboard controller 139 is the hardware interface for the keyboard 143, the mouse controller 140 is the hardware interface for the mouse 144, the video controller 141 is the hardware interface for the display 120, and the network controller 142 is the hardware interface for the network 100.

The apparatus includes a means for selecting a polygon to represent the number of nodes in a group and a means for presenting the polygon on the computer system display. The selecting and presenting means reside in the computer memory 134 and are acted upon by the computer processor 132 according to programmed instructions that enable the computer 130 to receive information from the user through the keyboard 143 or mouse 144 and to present information on the display 120. In initializing the monitoring of the network, the user instructs the computer 130 whether a polygon will be manually selected by the user or will be automatically selected, and may also indicate what criteria will be used to make the selection. The computer 130 collects data from the network and presents information useful for selecting the polygon such as the number of nodes on the network, physical locations of nodes, transmission media over which the nodes communicate, functions and functional inter-relationships of the nodes, security levels assigned to the nodes, and processing capacity of nodes. The computer 130 searches among the suitable polygons, including the number of sides and the appearance of the sides which may be selected. Once a polygon is selected, the computer 130 picks data from a table that corresponds to the selected description and generates a data structure. The computer 130 uses that data to construct and present an image on display 120.

The invention also includes a computer program product having instructions coded on a computer disk for instructing the computer 130 to show a polygon on the computer display 120 in accordance with the many features of the invention previously described. The user may load the instructions into memory 134 using the disk drive 137.

Figure 12:
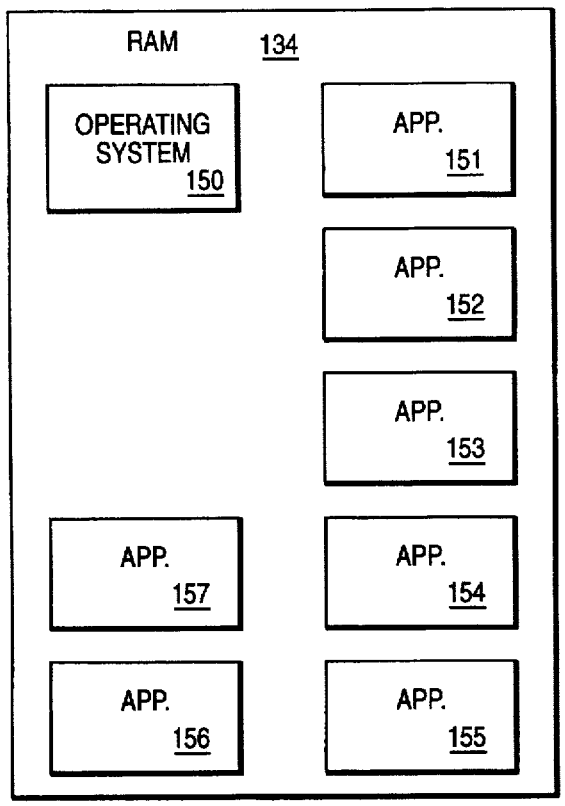
FIG. 12 depicts several applications active in the system memory according to the present invention.

The operating system on which the preferred embodiment of the invention is implemented is IBM's OS/2™ Version 2.0, although it will be understood that the invention could be implemented on other and different operation systems. As shown in FIG. 12, an operating system 150 is shown resident in RAM 134. The operating system 150 is responsible for determining which user inputs from the keyboard 143 and the mouse 144 go to which of the applications, transmitting those inputs to the appropriate applications and performing those actions as specified by the application and response to that input. For example, the operating system 150 would display the result of the icon image generation and control application 153 to the user on the graphic display 120. Among the applications resident in RAM 134 are a plurality of applications 151 through 157 for managing node group assignments, analyzing the distribution of group sizes and providing suggested icon parameters including base values and polygon shapes, generating and controlling icon images, collecting node status data, storing node alarm parameters, generating node status alarms, and generating node detail displays. For more information on IBM's OS/2 operating system, the reader is referred to *OS/2 2.0 Programming Guide*, Vol. II, Order No. 510G-6494-00, and *OS/2 2.0 Presentation Manager Programming Reference*, Vols. I, II, and III, Order Nos. 510G-6264-00, 510G-6265-00, and 510G-6272-00.

Figure 13:
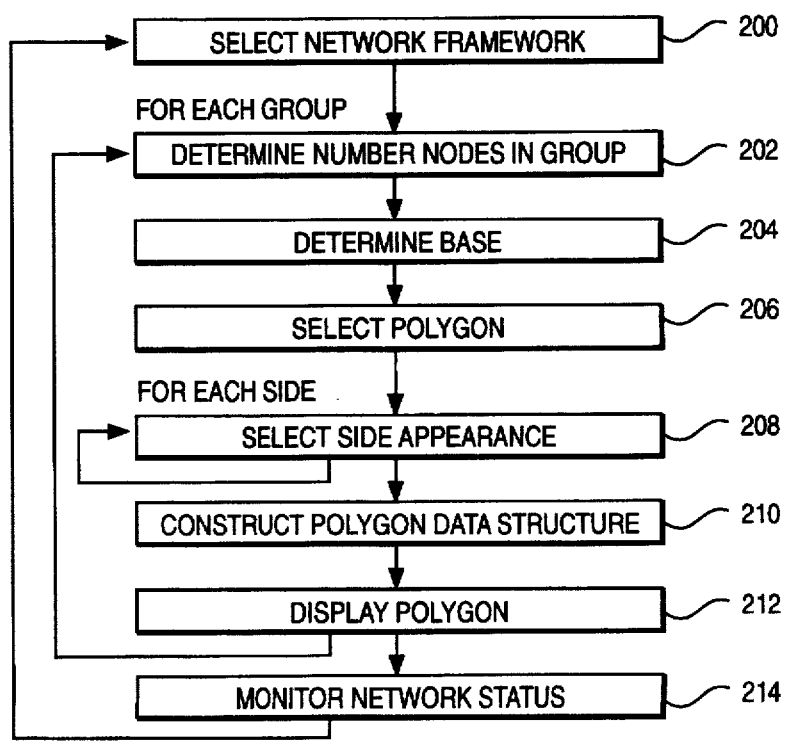
FIG. 13 depicts a method by which the method of the present invention may be implemented.

The flow diagram in FIG. 13 depicts one method by which the method of the present invention may be implemented. At initial screen presentation of the network, the process begins in step 200 where the network framework which is based on the total number of groups in the network is selected. For example, with a network having six groups, a bus having six stems for polygons might be selected. Next, for each group of nodes in the network, steps 202 through 212 are performed. In step 202, the number of the nodes in the group is determined. According to the number of nodes in the group, the base of the polygon is determined in step 204. Next, according to the base and the number of nodes in the group, the polygon is selected in step 206. Suitable polygons are shown in FIGS. 2–10 and described above. Step 208 is repeated for each side in the polygon wherein the side appearance is selected according to the number of nodes presented by that particular side of the polygon. Next, in step 210, the data structure for the polygon is constructed and stored in memory which includes information on the polygon selected, base and side appearance. Finally, the polygon data structure is passed the operating system in 212 and displayed on the monitor to the user. If this is not the last group in the network, the process returns to step 202. If all the groups in the network have been represented by polygons, the process goes to a monitoring state in step 214, which monitors the status of the network. If a network change, such as the number of nodes in a group is detected, the process starts anew in step 200 to display the new network status to the user.

While the invention has been described with respect to particular embodiments above it would be understood by those skilled in the art that modifications may be made without departing from the spirit and scope of the present invention. These embodiments are for purposes of example and illustration only and are not to be taken to limit the scope of the invention narrower than the scope of the appended claims. The invention is intended to be limited only as defined in the claims.

We claim:

1. A system for displaying a computer network on a system display, wherein network nodes are assigned to one of a plurality of groups of nodes, the system comprising:

a computer system including a processor, a memory and a display coupled to the network;

means for selecting a polygon to represent a respective number of nodes in each of the groups from a plurality of possible polygons, each of the selected polygons having a respective number of sides and each of the sides having a respective appearance, the number of sides and the appearance of sides in each polygon indicating the number of nodes in the group, wherein the appearance of at least one of the sides in at least one of the selected polygons indicates that the side represents more than one node in the respective group;

means for presenting icons of the selected polygons on the display; and means for presenting lines interconnecting the polygons on the display for representing network topology between the groups.

2. The system as recited in claim 1 wherein the selecting means includes means for selecting the number of sides of each polygon and the appearance of the sides of each polygon according to user input.

3. The system as recited in claim 1 wherein the selecting means includes means for selecting a base value for each polygon, wherein the number of nodes represented by a side of the polygon depends on the base value.

4. The system as recited in claim 3, wherein the base value is selected according to a distribution of the sizes of the groups.

5. The system as recited in claim 3, wherein the base value is displayed with the polygon.

6. The system as recited in claim 1, wherein the sides of at least one selected polygon each have a different respective appearance, and each different appearance of a side indicates that the side represents a different respective number of nodes.

7. The system as recited in claim 6, wherein at least one side of a selected polygon appears as a dashed line to indicate that the side represents zero nodes.

8. A method for displaying a computer network on a system display, wherein network nodes are assigned to one of a plurality of groups of nodes, the method comprising the steps of:

selecting a polygon to represent a respective number of nodes in each of the groups from a plurality of possible polygons, each of the selected polygons having a respective number of sides and each of the sides having a respective appearance, the number of sides and the appearance of sides in each polygon indicating the number of nodes in the group, wherein the appearance of a side in one selected polygon indicates that the side represents a plurality of nodes in the respective group; and presenting icons of the selected polygons on the display to display the computer network.

9. The method as recited in claim 8 wherein the selecting step includes the step of selecting the number of sides of each polygon and the appearance of the sides of each polygon according to user input.

10. The method as recited in claim 8 wherein the selecting steps includes the step of selecting a base value for each polygon, wherein the number of nodes represented by a side of the polygon depends on the base value.

11. The method as recited in claim 10, wherein the base value is selected according to the size of a largest group and also according to the size of a smallest group.

12. The method as recited in claim 8, wherein each polygon is selected independently of a network topology within the group.

13. The method as recited in claim 8, wherein the sides of at least one selected polygon each have a different respective appearance, and each different appearance of a side indicates that the side represents a different respective number of nodes.

14. The method as recited in claim 13, wherein at least one side of a selected polygon appears as a dashed line to indicate that the side represents zero nodes.

15. A computer program product on a computer readable medium for displaying a computer network on a system display, wherein network nodes are assigned to one of a plurality of groups of nodes, each group having a one of a plurality of potential network topologies, the product comprising:

means for selecting a polygon to represent a respective number of nodes in each of the groups from a plurality of possible polygons, each of the selected polygons having a respective number of sides and each of the sides having a respective appearance, the number of sides and the appearance of sides in each polygon indicating the number of nodes in the group, wherein at least one of the sides in at least one of the selected polygons represents more than one node in the respective group wherein the selecting means includes means for selecting the number of sides of each polygon and the appearance of the sides of each polygon according to user input; and means for presenting icons of the selected polygons on the display.

16. The product as recited in claim 15 further comprising means for presenting lines interconnecting the polygons on the display representing network topology between the groups.

17. The product as recited in claim 15 wherein the selecting means includes means for selecting a base value for each polygon, wherein the number of nodes represented by a side of the polygon depends on the base value.

18. The product as recited in claim 17, wherein the base value is selected according to a distribution of the sizes of the groups.

19. The product as recited in claim 17, wherein the base value is selected according to the size of a largest group and also according to the size of a smallest group.

20. The product as recited in claim 17, wherein the sides of at least one selected polygon each have a different respective appearance, and each different appearance of a side indicates that the side represents a different respective number of nodes.

21. The product as recited in claim 20, wherein at least one side of a selected polygon appears as a dashed line to indicate that the side represents zero nodes.

* * * * *